(12) United States Patent
Schmidt et al.

(10) Patent No.: US 9,194,953 B2
(45) Date of Patent: Nov. 24, 2015

(54) 3D TIME-OF-LIGHT CAMERA AND METHOD

(75) Inventors: Mirko Schmidt, Heidelberg (DE); Klaus Zimmermann, Neckartenzlingen (DE)

(73) Assignee: Sony Corporation, Tokyo (JP)

(*) Notice: Subject to any disclaimer, the term of this patent is extended or adjusted under 35 U.S.C. 154(b) by 1076 days.

(21) Appl. No.: 13/273,776

(22) Filed: Oct. 14, 2011

(65) Prior Publication Data

US 2012/0098935 A1 Apr. 26, 2012

(30) Foreign Application Priority Data

Oct. 21, 2010 (EP) .................................... 10188353

(51) Int. Cl.
*H04N 13/00* (2006.01)
*G01S 17/89* (2006.01)
(52) U.S. Cl.
CPC ...................................... *G01S 17/89* (2013.01)
(58) Field of Classification Search
USPC ...................................................... 348/42–60
See application file for complete search history.

(56) References Cited

PUBLICATIONS

Lindner et al., "compensation of Motion Artifacts for Time-of-Flight Cameras", Dyn3D 2009.*
Schmidt, "Spatiotemporal Analysis of Range Imager", Dissertation submitted to the Combined Faculties for the Natural Sciences and for Mathematics of the Ruperto-Carola University of Heidelberg, Germany for the degree of Doctor of Natural Sciences, Nov. 2008.*
U.S. Appl. No. 13/343,444, filed Jan. 4, 2012, Schmidt et al.
Marvin Lindner, et al., "Compensation of Motion Artifacts for Time-of-Flight Cameras", Dyn3D 2009, 12 Pages.
R. Schwarte, et al., "An new active 3D-Vision system based on rf-modulation interferometry of incoherent light", SPIE, vol. 2588, 1995, 10 Pages.
T. Spirig, et al., "The Lock-In CCD—Two-Dimensional Synchronous Detection of Light", IEEE Journal of Quantum Electronics, vol. 31, No. 9, Sep. 1995, 4 Pages.
O. Elkhalili, et al., "A 64×8 Pixel 3-D CMOS Time of Flight Image Sensor for Car Safety Applications", IEEE, 2006, 4 Pages.
Thierry Oggier, et al., "An all-solid-state optical range camera for 3D real-time imaging with sub-centimeter depth resolution (SwissRanger™ )", CSEM SA, 2004, 12 Pages.
S. Burak Gokturk, et al., "A Time-of-Flight Depth Sensor—System Description, Issues and Solutions", Proceedings of the 2004 Conference on Computer Vision and Pattern Recognition Workshop (CVPRW'04), vol. 3, 2004, 9 Pages.
Thorsten Ringbeck, et al., "A 3D Time of Flight Camera for Object Detection", Optical 3-D Measurement Techniques, 2007, 10 Pages.

(Continued)

*Primary Examiner* — Dave Czekaj
*Assistant Examiner* — Shanika Brumfield
(74) *Attorney, Agent, or Firm* — Oblon, McClelland, Maier & Neustadt, L.L.P.

(57) ABSTRACT

The present invention relates to a 3D time-of-flight camera for acquiring information about a scene, in particular for acquiring depth images of a scene, information about phase shifts of a scene or environmental information about the scene. The proposed camera particularly compensates motion artifacts by real-time identification of affected pixels and, preferably, corrects its data before actually calculating the desired scene-related information values from the raw data values obtained from radiation reflected by the scene.

21 Claims, 6 Drawing Sheets

(56) References Cited

PUBLICATIONS

G. Yahav, et al., "3D Imaging Camera for Gaming Application", International Conference on Consumer Electronics, Digest of Technical Papers, 2006, 2 Pages.

Martin Otmar Schmidt, "Spatiotemporal Analysis of Range Imagery", Dissertation submitted to the Combined Faculties for the Natural Sciences and for Mathematics of the Ruperto-Carola University of Heidelberg, Germany for the degree of Doctor of Natural Sciences, Nov. 2008, 166 Pages.

* cited by examiner

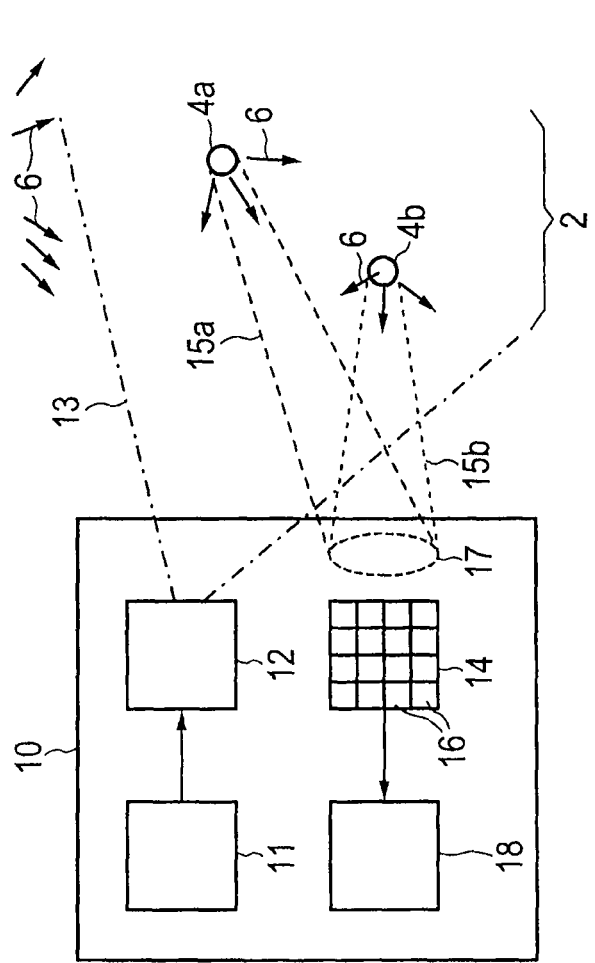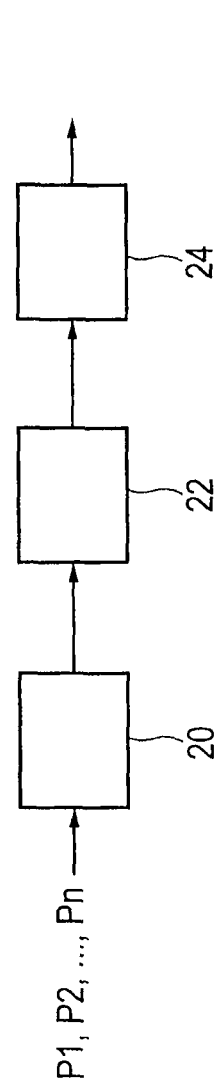

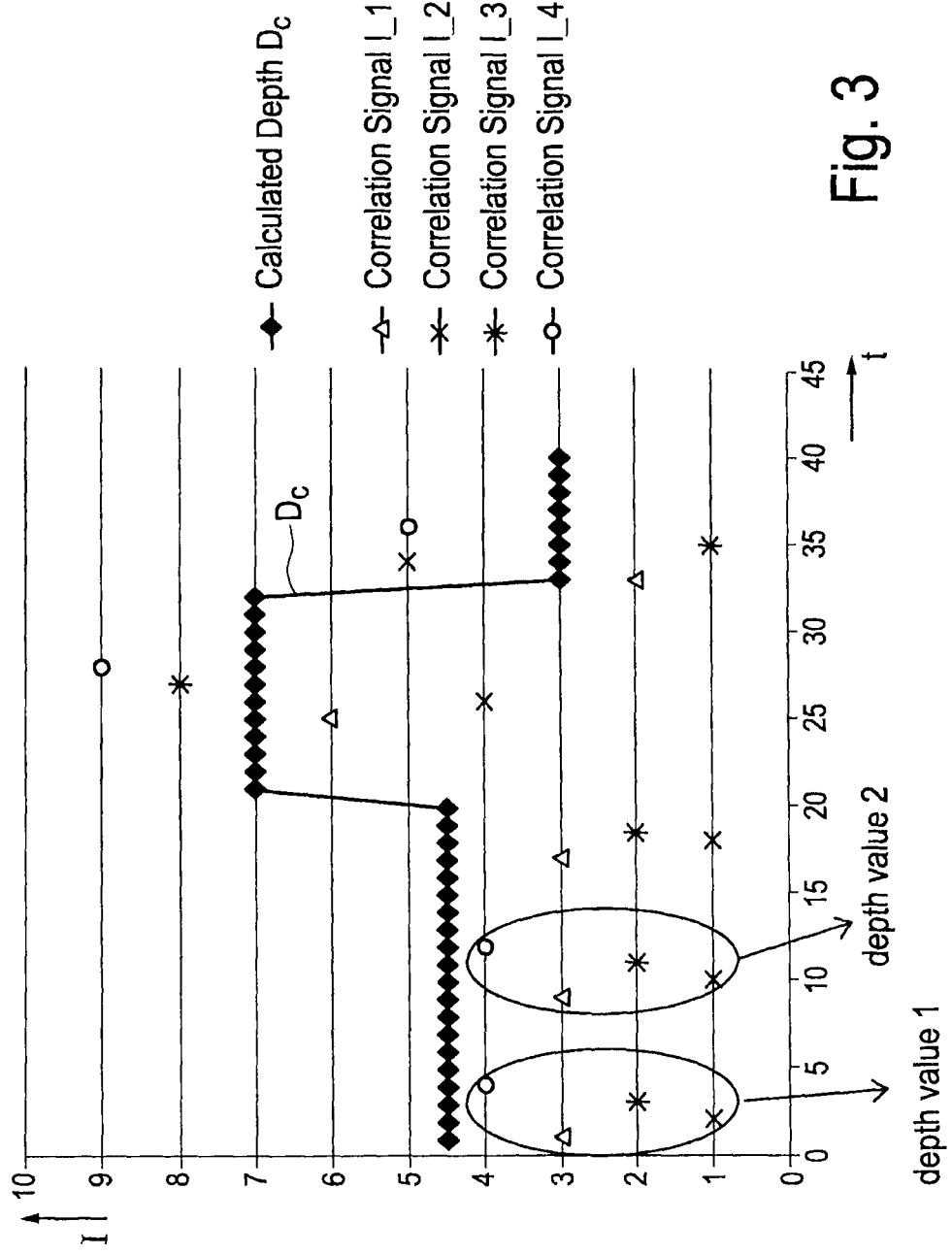

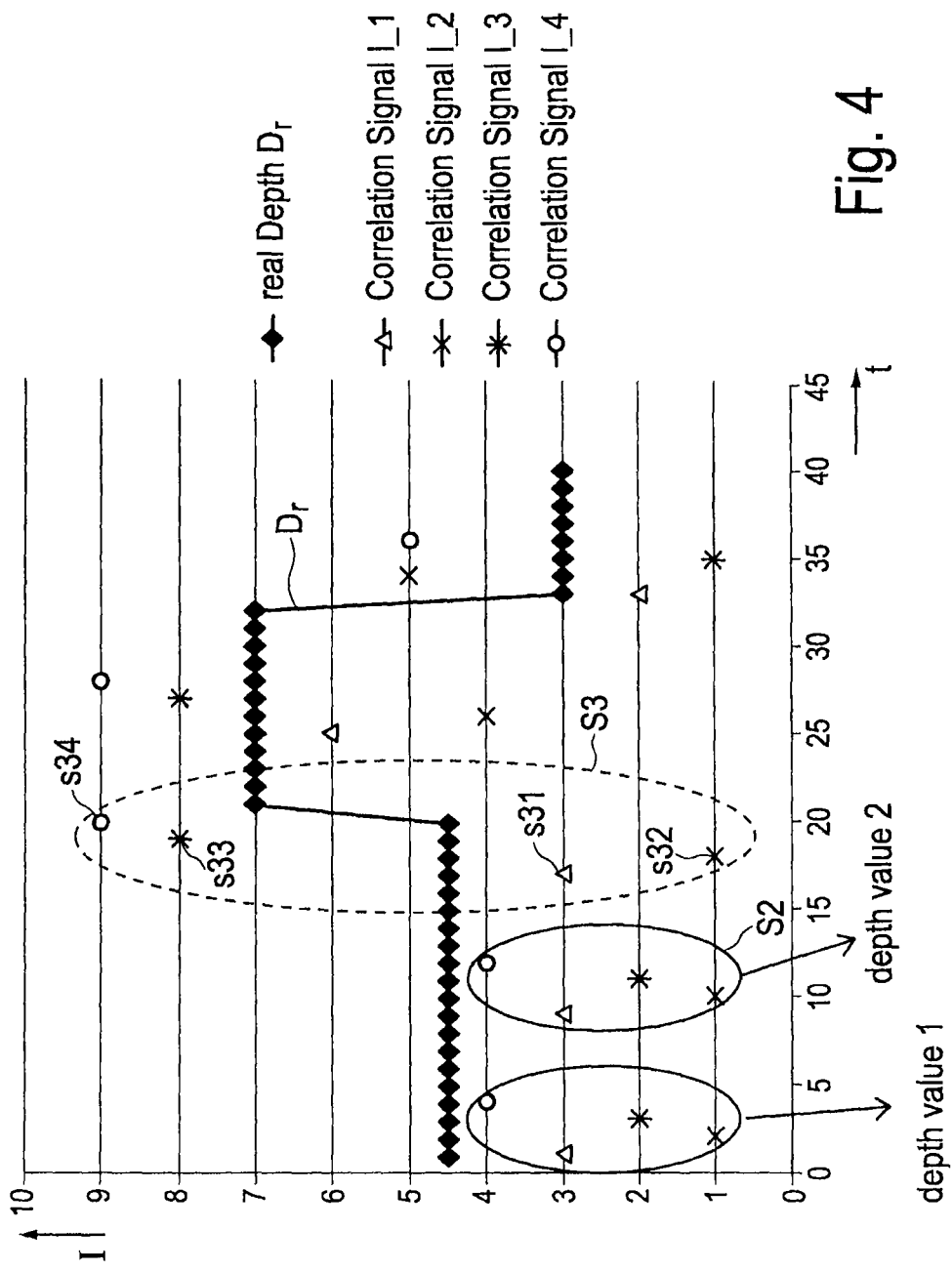

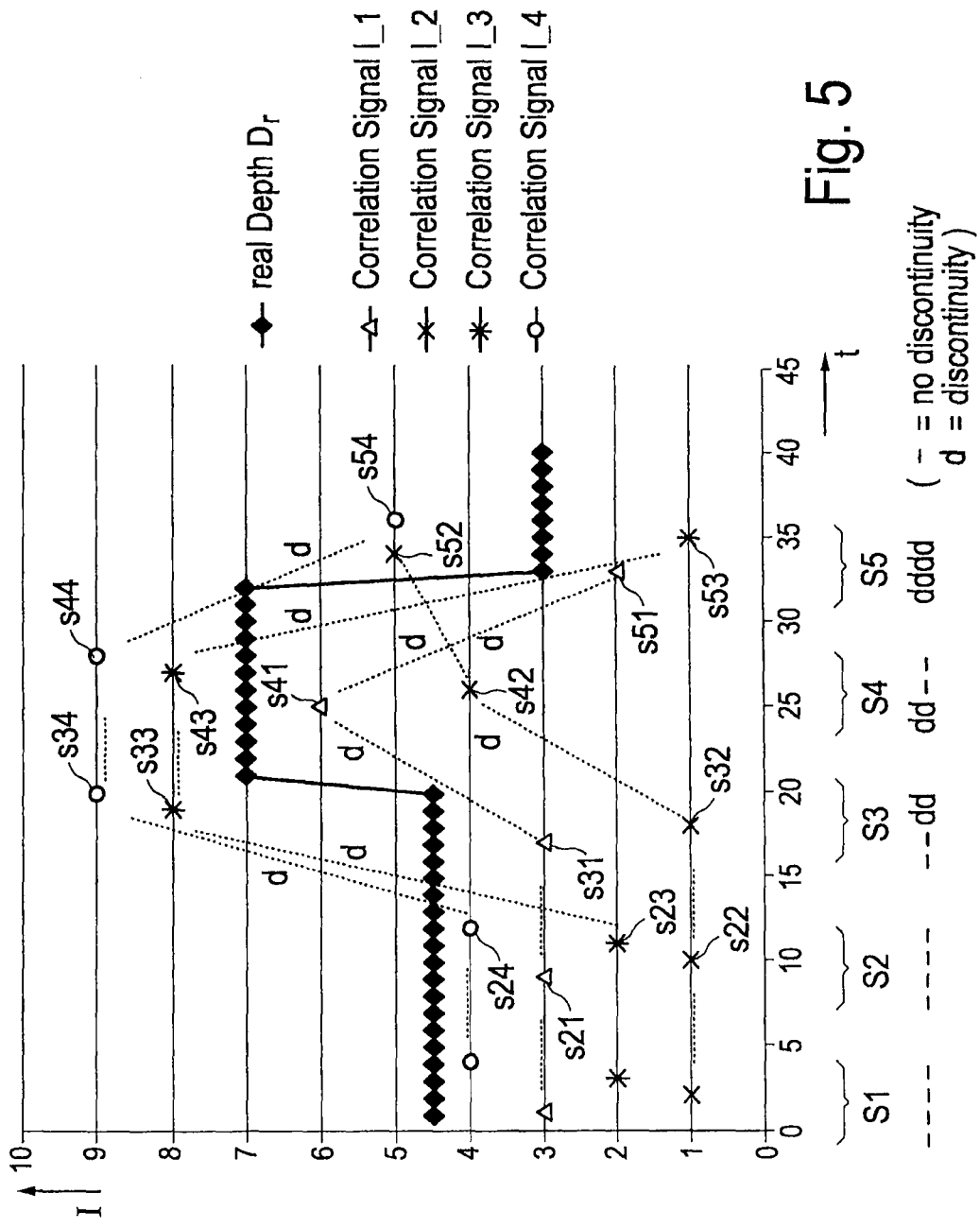

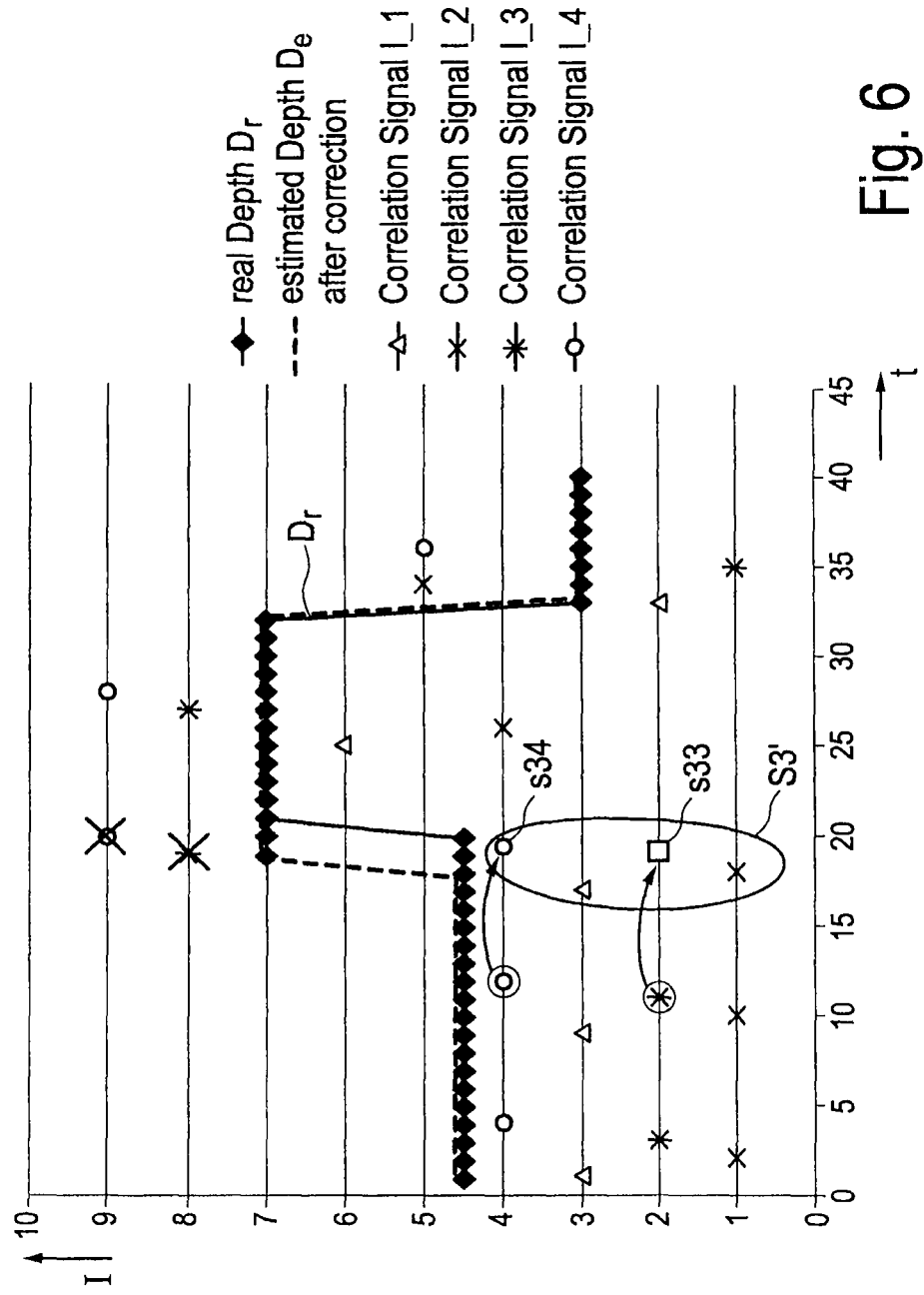

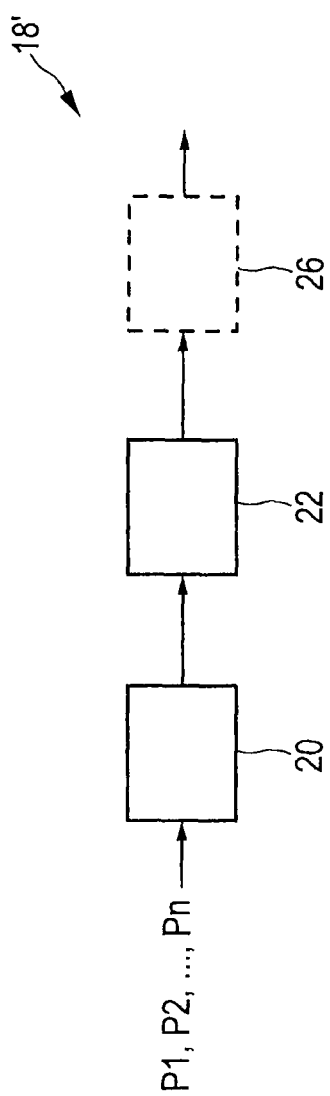

3D TIME-OF-LIGHT CAMERA AND METHOD

CROSS-REFERENCE TO RELATED APPLICATIONS

The present application claims priority of European patent application 10188353.6 filed on Oct. 21, 2010.

FIELD OF THE INVENTION

The present invention relates to a 3D time-of-flight camera and a corresponding 3D time-of-flight method for acquiring information about a scene, in particular for acquiring depth images of a scene, information about phase shifts between a reference signal and incident radiation of a scene or environmental information about the scene. Further, the present invention relates to a processor and a corresponding processing method for use in such a 3D time-of-flight camera and method. Still further, the present invention relates to a computer program for implementing such a processing method on a computer and a computer readable non-transitory medium storing such a computer program.

BACKGROUND OF THE INVENTION 3D time-of-flight (ToF) cameras acquire depth images by determining the time which radiation, preferably light, needs from a source to an object and back to the camera. This is generally done by illuminating the scene discontinuously and applying a convolution of a temporal window (strictly speaking: a sequence of windows) to the backscattered incident optical signal. Typically, three quantities are unknown and have to be determined for each pixel individually: the object's distance, its reflectivity and the intensity of ambient light. Therefore, one or more (dependent on the number of unknowns) measurements, for instance at least three measurements in case of three unknowns, are necessary to determine these unknowns.

There are several reasons, why current ToF cameras and methods do not deliver optimal depth maps for moving sceneries. One reason is the motion blur affecting each raw image. Because the ToF camera is integrating the incident signal over a certain time window, edges and fine details of moving objects are blurred. Another reason is the temporal delay between raw data acquisitions. Current ToF cameras are not able to acquire all raw images instantaneously, but have to capture them consecutively. There are ToF cameras which acquire subsets of necessary raw values (called subframes) in parallel, but currently no ToF camera exists which measures all raw values synchronously.

If one or multiple of the unknowns (depth, background light, reflectivity) change during that process, the reconstruction generates incorrect results. More precisely, if at least one of the three unknowns (depth, background light, reflectivity) changes, the computed depth of affected pixels is incorrect. It should be noted that also other data channels generated by the ToF camera, e.g. describing the measured intensity of non-modulated radiation or the modulation amplitude of the detected signal (typical for continuous-wave ToF systems), will contain corrupt data in that case. In the following, the explanation will focus on the computed depth, but the argumentation and the proposed methods and devices are also valid and equally applicable for all other processed channels.

These kinds of errors might be caused, for instance, by rapidly changing features of the scene, for instance by moving depth or color edges. If the movement is parallel to the projection beam of a certain pixel, the signal deviations affecting this pixel are small due to the typically low speed of the objects. In contrast, laterally moving edges effect rapid changes of raw values, thus leading to strong errors and strong motion artifacts. When regarding the temporal signal of one raw channel of one pixel, a discontinuity occurs at the time step as the edge hits the pixel.

One method to prevent motion artifacts using continuous-wave ToF cameras is known from Lindner, Kolb: Compensation of Motion Artifacts for Time-of-Flight Cameras, Dynamic 3D Imaging, LNCS 5742/2009, p. 16-27, DOI 10.1007/978-3-642-03778-8, Berlin/Heidelberg 2009. Their approach performs optical flow estimation on all raw images to measure the movements of regions in the scene. In a further step, the estimated flow fields are used to warp and register the raw images. This ensures that each depth value is constructed from raw data describing the same point in the scene, and thus prevents motion artifacts. The drawback of this approach is, however, the high computational effort, which necessitates means like GPU implementations to process the data with appropriate speed. Further drawbacks are the necessity for intensity normalization of different raw channels and that there is no dense reconstruction (necessity for inpainting).

A Continuous-wave ToF sensor (PMD sensor) is described in Schwarte, R., Heinol, H. G., Xu, Z., Hartmann, K.: New active 3D vision system based on rf-modulation interferometry of incoherent light, in Casasent, D. P. (ed.) Society of Photo-Optical Instrumentation Engineers (SPIE) Conference Series, vol. 2588, pp. 126-134 (1995) and in Spirig, T., Seitz, P., Heitger, F.: The lock-in CCD. Two-dimensional synchronous detection of light. IEEE J. Quantum Electronics 31, 1705-1708 (1995).

More information about the general technology of TOF cameras can be found in Elkhalili, O., Schrey, O., Ulfig, W., Brockherde, W., Hosticka, B. J., Mengel, P., Listl, L.: A 64×8 pixel 3-D CMOS time-of flight image sensor for car safety applications (2006), in Gokturk, S. B., Yalcin, H., Bamji, C.: A time-of-flight depth sensor—System description, issues and solutions, in http://www.canesta.com/assets/pdf/technicalpapers/CVPR_Submission_TOF.pdf, and in Oggier, T., Lehmann, M., Kaufmann, R., Schweizer, M., Richter, M., Metzler, P., Lang, G., Lustenberger, F., Blanc, N.: An all-solid-state optical range camera for 3D real-time imaging with sub-centimeter depth resolution (2004), and in Ringbeck, T., Hagebeuker, B.: A 3D time-of-flight camera for object detection (2007).

BRIEF SUMMARY OF INVENTION

It is an object of the present invention to provide a 3D time-of-flight camera and a corresponding 3D time-of-flight method which effectively detect and compensate motion artifacts without requiring high computational efforts or complex additional hardware. It is a further object of the present invention to provide a processor and a corresponding processing method as well as a corresponding computer program for implementing said processing method and a computer readable non-transitory medium.

According to an aspect of the present invention there is provided a 3D time-of-flight camera for acquiring information about a scene, in particular for acquiring depth images of a scene, information about phase shifts between a reference signal and incident radiation of a scene or environmental information about the scene, said camera comprising:

a radiation source that generates and emits electromagnetic radiation for illuminating said scene, a radiation detector that detects electromagnetic radiation reflected from said scene, said radiation detector comprising one or more pixels, in particular an array of pixels, wherein said one or more pixels individually detect electromagnetic radiation reflected from said scene and generate a pixel signal, an evaluation unit that evaluates said one or more pixel signals and generates scene-related information from said one or more pixel signals, wherein said evaluation unit comprises an information value calculator that determines an information value of said scene-related information from a set of at least two subsequent samples of the same pixel signal, and a discontinuity detector that detects if in said set of at least two subsequent samples a discontinuity appears compared to the previous set of at least two subsequent samples of the same pixel signal.

According to a further aspect of the present invention there is provided a processor for use in a 3D time-of-flight camera for acquiring information about a scene, in particular for acquiring depth images of a scene, information about phase shifts between a reference signal and incident radiation of a scene or environmental information about the scene, wherein said camera comprises a radiation source that generates and emits electromagnetic radiation for illuminating said scene, and a radiation detector that detects electromagnetic radiation reflected from said scene, said radiation detector comprising one or more pixels, in particular an array of pixels, wherein said one or more pixels individually detect electromagnetic radiation reflected from said scene and generate a pixel signal, said processor being operable to evaluate said one or more pixel signals and to generate scene-related information from said one or more pixel signals, wherein said processor comprises:

an information value calculator that determines an information value of said scene-related information from a set of at least two subsequent samples of the same pixel signal, and a discontinuity detector that detects if in said set of at least two subsequent samples a discontinuity appears compared to the previous set of at least two subsequent samples of the same pixel signal.

According to further aspects of the present invention a 3D time-of-flight method for acquiring depth images of a scene and a processing method are provided. According to still further aspects a computer program comprising program means for causing a computer to carry out the steps of the processing method according to the present invention, when said computer program is carried out on a computer, as well as a computer readable non-transitory medium having instructions stored thereon which, when carried out on a computer, cause the computer to perform the steps of the processing method according to the present invention are provided.

In a preferred embodiment the 3D time-of-flight camera comprises a discontinuity corrector that corrects a detected discontinuity of a sample in said set of at least two subsequent samples by replacing the sample value of said sample by the sample value of the corresponding sample of said previous set of at least two subsequent samples of the same pixel signal, wherein said information value calculator is operable to use said corrected set of at least two subsequent samples of the same pixel signal to determine said information value.

Further preferred embodiments of the invention are defined in the dependent claims. It shall be understood that the claimed methods, the claimed computer program and the claimed computer readable medium have similar and/or identical preferred embodiments as the claimed 3D time-of-flight camera and as defined in the dependent claims.

The present invention is based on the idea to detect motion artifacts and, in a preferred embodiment, compensate them by utilizing raw values (i.e. sample values) of a prior acquisition (i.e. a previous set of samples) of said raw values. The basic assumption is that raw values acquired by ToF devices, i.e. the detector, vary smoothly over time. Strong artifacts are caused by rapid changes of scene features or laterally moving edges, e.g. depth- and/or color-edges. Such moving edges include, for instance, moving edges of non-modulated radiation (including background light). Today's cameras assume the unknowns (phase, amplitude, background light/non-modulated light) to vary smoothly. Moving objects can cause discontinuities of one or multiple unknowns (e.g. edges of depth, color, or non-modulated light).

By analyzing the temporal signal (i.e. the pixel signal) of a single raw channel of a single pixel, such a moving edge can be identified as a discontinuity. In particular, the pixel signals that depend on the time-of-flight of the reflected radiation are analyzed, and not every pixel signal depends on the time of flight in the same manner, i.e. the pixel performs multiple measurements consecutively, which different measurements form the set of the at least two subsequent samples.

This analysis is preferably performed for each raw channel. If none or all channels detect a discontinuity, no correction has to be done. In all other cases, the raw values of channels experiencing a discontinuity may be overwritten using the corresponding values of the prior acquisition, or a signal may be issued that a discontinuity has been detected. In case of correction, the computed information value does not represent the current state of the scene, but corresponds to a prior state. However, this temporal misestimation of the scene state is smaller than the temporal distance of two acquisitions, and thus is negligible in most applications.

In particular, if all raw values constructing the information value are acquired before an edge hits the pixel (i.e. before the discontinuity occurs), the computed information value is correct. In case that all raw values constructing the information value are acquired after the event, the information value is also correct (but shows another state of the scene). However, in case of constructing the information value by combining raw values acquired before with raw values acquired after the event, the computed information value is incorrect. Incorrect in that sense means that the information value does not represent the state of the scene either before or after the event. Generally, the information value is also not between these information values, meaning it is not comparable to an averaged measurement. Instead it lays somewhere in the available depth range. Therefore, such motion artifacts highly degrade the quality of generated depth maps.

The solution proposed here focuses on the detection and, preferably, neutralization of this kind of motion artifacts, caused by rapid changes or lateral movement of scene features. This lateral movement is the most critical contribution for motion artifacts, and its correction will lead to information, where the effect of residual motion artifacts is negligible for most applications. A detection of discontinuities without correction is beneficial in certain applications. Furthermore there are cases where a correction fails (i.e. leads to worse data than without a correction). In such cases it is preferred in an embodiment to take the detector signal as a warning, i.e. to recognize that "something is wrong with the data", but to waive an automatic correction.

The present invention is preferably applied for acquiring depth images of the scene. For such kinds of applications said evaluation unit is operable to generate scene-related information about the distance of one or more objects of the scene, the reflectivity of one or more objects of the scene and/or the intensity of non-modulated radiation (including ambient radiation, in particular ambient light), i.e. said scene-related information may be a distance information, a reflectivity information and/or an intensity information of the background radiation.

The invention may, however, also be applied in other applications, e.g. for acquiring information about phase shifts of a scene or environmental information about the scene. Such other applications include Fluorescence Lifetime Imaging (FLIM), where the phase shift of a specimen is measured using a microscope, and applications to estimate environmental parameters (e.g. temperature, oxygen concentration, etc.). Also applications using pressure sensitive paint (PSP) may benefit from the invention.

While generally a wide range of electromagnetic radiation is generally available for use with the invention, i.e. the invention may be used in different kinds of applications using different kinds of radiation, the invention is preferably applied for use infrared, visible or ultraviolet light. Generally, the radiation source and radiation detector are accordingly adapted for the kind of used radiation. If necessary, appropriate converters (in the detector or in addition to the detector) are used for conversion of detected radiation into a preferred wavelength range for further processing and evaluation.

According to another aspect the present invention provides a 3D time-of-flight camera for acquiring information about a scene, in particular for acquiring depth images of a scene, information about phase shifts between a reference signal and incident radiation of a scene or environmental information about the scene, said camera comprising:

radiation generation means for generating and emitting electromagnetic radiation for illuminating said scene, radiation detection means for detecting electromagnetic radiation reflected from said scene, said radiation detection means comprising one or more pixels, in particular an array of pixels, wherein said one or more pixels individually detect electromagnetic radiation reflected from said scene and generate a pixel signal, evaluation means for evaluating said one or more pixel signals and generating scene-related information from said one or more pixel signals, wherein said evaluation means comprises information value calculation means for determining an information value of said scene-related information from a set of at least two subsequent samples of the same pixel signal, and discontinuity detection means for detecting if in said set of at least two subsequent samples a discontinuity appears compared to the previous set of at least two subsequent samples of the same pixel signal.

BRIEF DESCRIPTION OF THE DRAWINGS

These and other aspects of the present invention will be apparent from and explained in more detail below with reference to the embodiments described hereinafter. In the following drawings FIG. 1 shows a schematic diagram of a 3D ToF camera according to the present invention, FIG. 2 shows a schematic diagram of a first embodiment of a processor according to the present invention for use in such a 3D ToF camera, FIGS. 3-6 show diagrams illustrating the principle and the effect of the present invention in a first situation, FIG. 7 shows a schematic diagram of a second embodiment of a processor according to the present invention for use in a 3D ToF camera as shown in FIG. 1.

DETAILED DESCRIPTION OF THE INVENTION

A schematic diagram of a 3D ToF camera 10 according to the present invention is shown in FIG. 1. Such a camera 10 is generally used for acquiring information about a scene 2. Such information may particularly comprise information for generating depth images of a scene, information about phase shifts of a scene or environmental information about the scene. The following description referring to FIGS. 1 to 6 will, as an example, focus on the acquisition of depth images, in particular on the acquisition of distance information about the distance of one or more objects, in the embodiment shown in FIG. 1 a background object 4a and a foreground object 4b, of the scene 2 from the camera 10. This distance information is, besides the reflectivity of one or more objects 4 of the scene 2 and the intensity of non-modulated radiation (which includes ambient light and non-modulated light emitted by the radiation source) 6, one of the three unknown factors to be determined to be able to generate depth images of the scene 2.

The camera 10 comprises a radiation source 12 that generates and emits electromagnetic radiation 13 for illuminating said scene 2 and a radiation detector 14 that detects electromagnetic radiation 15 reflected from said scene 2. The radiation source 12 is, in this embodiment, controlled by a source controller (or driver) 11, which may, in other embodiments, be included in the source 12. Said radiation detector 14 comprises one or more pixels 16, in particular a two-dimensional array of pixels, wherein said one or more pixels 16 individually detect electromagnetic radiation 15a, 15b reflected from said scene 2 (more precisely, from the objects 4a, 4b of the scene) and generate a pixel signal.

The radiation detector 14 comprises means which cause that the measured pixel signals depend on the temporal delay between the incident radiation signal and a reference signal. This ability is an important component of ToF systems. For pulsed ToF systems, this might be a variation of measured intensities, caused by a shutter (which may be part of the detector (e.g. an electronical shutter) or embodied as an additional element located between detector 14 and scene 2 (e.g. a physical shutter)). In continuous-wave ToF systems, such temporal delay is interpreted as a phase shift between the incident radiation signal and an electronic reference signal. From that temporal delay, it is possible to measure the time which the radiation needs from source 12 to object 4a and from the object to the detector 14. Analogously the time from source 12 to object 4b and from the object to the detector 14 may be measured. In depth imaging it is assumed that there is no delay between irradiating the objects 4a and 4b, and its optical responses. So from the known speed of the radiation (which is the speed of light in the surrounding environment) and the measured time which the radiation needs to cover the distance from the source 12 via the objects 4a and 4b to detector 14, the distance of the objects may be computed.

In FLIM (Fluorescense Lifetime Imaging) applications the distance of the objects is known (or negligible, or measured additionally), but the response delay (between the light hitting the objects 4a and 4b, respectively, and the emission of light by these objects, being detected by detector 14) is unknown and has to be measured. Depending on the objects' characteristics (possibly modified by dyes), this temporal delay provides information about environmental parameters (like local oxygen concentration, temperature, etc.). It should be noted here that radiation reflected from objects 4a and 4b is generally not mixed onto a single pixel, but the optics ensure that different points in the object space are imaged by different pixels. If two objects are imaged by a single pixel, this pixel measures erroneous values leading to another artifact (flying pixel), which is not tackled by the present invention. For example, a depth edge between an object in the foreground and one in the background would lead to such artifacts: The depth values measured at the edge are typically neither estimated as foreground, nor as background depth, but something else.

Optional means, such as optical lenses, focusing elements etc., may be provided in addition, in particular for forming the radiation beam 13 for illuminating the scene 2 and/or for focusing the reflected radiation 15 onto the radiation detector 14. For instance, as shown in FIG. 1, an optical lens 17 and a band pass filter may be provided in front of the radiation detector 14 for collecting the reflected radiation and for letting only reflected radiation pass onto the detector 14 having the same wavelength as the illuminating radiation 13.

Preferably, infrared light is used for illumination and for detection, but also visible light or UV light or other electromagnetic radiation may be used according to the present invention. Generally, the used radiation may be selected from the wavelength range between 0.1 nm and 1 cm, in particular between 10 nm and 1 mm.

The emitted radiation may be continuously emitted (e.g. sinusoidally modulated), or may be pulsed. A typical case is to use a burst mode, in which the radiation source is driven continuously (e.g. with a sinusoidal excitation function), but only during the acquisition of samples. At other times, it is switched off to allow the radiation source to cool down and to keep the average intensity at minimum (eye safety reasons). So over large time scales, it is actually not really continuous.

In any case, the detector and the subsequent processing of the acquired pixel signals are then appropriately adapted. Both principles—continuously emitted radiation and pulsed radiation—are generally known for use in 3D ToF cameras, e.g. from various types of 3D ToF cameras on the market (e.g. the Z-Cam (3DV Systems, Israel) as an example using pulsed radiation and the PMD CamCube (PMDTechnologies, Germany) or Swissranger SR4000 (Mesa Imaging, Switzerland) as examples using continuous radiation). The usage of non-periodical irradiation is also possible, as described in Buettgen, B.; Mechat, M.-A. E.; Lustenberger, F. & Seitz, P. "Pseudonoise optical modulation for real-time 3-D imaging with minimum interference", IEEE TRANSACTIONS ON CIRCUITS AND SYSTEMS I-REGULAR PAPERS, IEEE-INST ELECTRICAL ELECTRONICS ENGINEERS INC, {2007}, {54}, {2109-2119}. When using pulsed radiation depth information can be obtained from the intensity of the reflected radiation, while when using continuous radiation, a depth information can be obtained from phase differences in the reflected radiation. Since these principles are generally known no further details are provided here.

The camera 10 further comprise an evaluation unit 18 that evaluates the one or more pixel signals acquired by the one or more pixels 16 of the radiation detector 14 and generates scene-related information from said one or more pixel signals. Said scene-related information may, as mentioned above, be a depth information, phase shift information, environmental information, etc. Here, it will be focused on the generation of depth information as an example. The present invention and the elements explained hereinafter with reference to FIGS. 1 to 6 may, however, similarly or identically be applied for the generation of other information as well.

An embodiment of the evaluation unit 18, which may be implemented as a processor, e.g. a programmable microprocessor or a computer, or as dedicated hardware, is schematically depicted in FIG. 2. The evaluation unit 18 comprises an information value calculator 20, which receives the one or more pixel signals P1, P2, ..., Pn (n being the number of pixels). Each pixel signal Px is generated by a different pixel of the detector 14 and comprises a number of subsequently (in time) acquired samples. For instance, each pixel 16 continuously acquires samples of the (intensity and/or phase of the) reflected radiation hitting said pixel and outputs these samples to the information value calculator 20. From the samples of one pixel signal the information value calculator 20 determines an information value of said scene-related information, in particular from a set of at least two (preferably at least three) subsequent samples of a pixel signal an information value, in the example described here a distance information value, is generated. This is preferably done continuously, i.e. for each subsequent set of at least two samples of a pixel signal a new information value is generated, and this is preferably done in parallel for all or selected pixels. These information values (here distance information values) then allow the generation of a scene-related information, here of a depth image of the scene 2 showing the different distances of the different objects 4 from the camera 10.

This generation of distance information from a pixel signal shall be explained with reference to the diagram shown in FIG. 3. In this diagram the intensities I of acquired samples of a single pixel signal are depicted over time t (using a continuous wave ToF camera). Sets of subsequent four samples are used in this example to generate one distance information value (also called depth value here), e.g. by computing the phase shift $\phi$ as $\phi=\arctan((I3-I1)/(I2-I0))$, and then computing the depth d as $d=(\phi*c)/(4*\pi*\nu)$. Here I0, I1, I2, I3 correspond to samples of the correlation function of a sinusoidal light signal with a rectangular reference signal, delayed by an angle $\theta=\{0°, 90°, 180°, 270°\}$. c is the speed of light and $\nu$ is the modulation frequency of the light source (it should be noted that this reconstruction is only valid for four samples per set, and only for a continuous wave ToF system using an approximately sinusoidal modulation). For instance, as shown in FIG. 3, samples 1 to 4 are used to generate depth value 1, samples 5 to 8 are used to generate depth value 2, and so on.

The generated depth values result in a depth curve $D_c$ of the calculated depth, which is also depicted in FIG. 3, said depth curve $D_c$ indicating the distance of the scanned objects of the scene from the camera. In the situation shown in FIG. 3, the calculated depth curve correctly reflects the real depth of objects. However, there are situations in which problems occur, which shall be explained with reference to FIG. 4.

In the diagram shown in FIG. 4 a situation is depicted, in which the four samples s31, s32, s33, s34 of the third set S3 show a discontinuity compared to the four samples s21, s22, s23, s24 of the second set S2. In particular, while the samples s31, s32 of the third set S3 substantially have the same values as the corresponding samples s21, s22 of the preceding set S2, the s33, s34 of the third set S3 do not have substantially the same intensity values as the corresponding samples s23, s24 of the preceding set S2, but have much higher intensity values (indicating that the object or a scene feature has—most likely—moved during the acquisition of the samples s31, s32, s33, s34 of the third set S3).

Now, if depth value 3 shall be calculated from the samples s31, s32, s33, s34 of the third set S3, the result may be wrong, i.e. the depth may be estimated incorrectly. Assuming the same system as described above, this could correspond to the case of I0=s31, I1=s32, I2=s33, I3=s34. So computing the phase shift $\phi$ (using the formula mentioned above) will in general lead to different (and wrong) results, if the samples were acquired under different conditions, for instance if s33 and s34 describe another state of the scene than s31 and s32 do.

To cope with such situations and solve such problems, a discontinuity detector 22 is provided as part of the evaluation unit 18 according to the present invention (see FIG. 2). Said discontinuity detector 22 detects if in said sets of at least two subsequent samples (in the embodiment shown in FIGS. 3 and 4 sets of four samples are used) a discontinuity appears compared to the previous set of at least two subsequent samples of the same pixel signal. In particular, in a preferred embodiment, for each sample value of a sample a comparison is made to the sample value of the corresponding (uncorrected) sample in the preceding set of samples. For instance, as illustrated in FIG. 5, discontinuities (indicated by "d" in the figure) are detected between the samples s23 and s33, s24 and s34, s31 and s41, s32 and s42, s41 and s51, s42 and s52, s43 and s53, and s44 and s54.

Hence, generally the comparison is made to the directly preceding set. However, the comparison to earlier sets are generally possible as well and shall be understood to be covered by the definition that the comparison is made to the previous set. Such a comparison to an earlier set (i.e. earlier to the directly preceding set) would, however, use a lower temporal resolution and give less accuracy, but there might be embodiments which allow only such a comparison with earlier sets.

Generally, also a comparison to subsequent sets could be possible, if the data is available (in "live systems" that will most likely not be the case). On the other hand, if there are two sets A and B, the comparison of set A with subsequent set B will lead to similar results as comparing set B with a previous set A, i.e. there might be no real advantage for a comparison with subsequent sets.

Looking at the five sets S1 to S5 each including four samples now it shows (and is detected by the discontinuity detector 22, that there are two discontinuities at the end of the third set S3, two discontinuities at the beginning of the fourth set S4, and four discontinuities in the fifth set S5.

This information, i.e. the output of the discontinuity detector 22, is now provided to a discontinuity corrector 24 (see FIG. 2) that corrects certain detected discontinuities. In particular, in an embodiment, discontinuities appearing in a set of at least two samples used for calculating one depth value are only corrected if said discontinuity does not appear in the beginning samples of said set and if for all subsequent samples of said set at least in the last sample a discontinuity is detected. I.e. the set comprises one or more continuous values, followed only by one or more discontinuous values. Even more preferably (and more robust as a general rule), after the first detected discontinuity only discontinuities are present up to the last sample of the set, but there is no more continuous value available after the first discontinuity in the set. This means (looking at the situation depicted in FIG. 5) that the discontinuities detected in sets S4 and S5 are not corrected since these sets also include a discontinuity in the first sample (although these sets also include discontinuities in subsequent samples of the same sets). But the discontinuities detected in set S3 are corrected since this set includes no discontinuity in the first sample and also includes one sequence of consecutive discontinuities in subsequent samples up to the last sample.

The sets S4 and S5 should not be corrected, i.e. no correction should be made if the discontinuity is only in the beginning samples of a set, or if all samples are discontinuous. The question is, if the edge occurred within the current set or not. Generally, only if it occurred inside, a correction is necessary. For the set S5 this means that, if all samples are discontinuous, all samples changed compared to the prior set S4. From that it follows that the reason (i.e. the moving edge) occurred between S4 and S5. Therefore all samples of S5 describe the same state of the scene, so the reconstruction of depth is correct.

For the set S4 the temporal order is known: s31, s32, s33, s34, s41, s42, s43, s44. To know if a correction is necessary, it is important to understand when the edge occurred: If s41, s42 are discontinuous compared to s31, s32 it follows that the edge occurred between s41 and s31 and between s42 and s32. If s43, s44 are continuous compared to s33, s34 it follows that no edge is between s43 and s33 and that no edge is between s44 and s34. In case of a combination, i.e. if there is a discontinuity between s42 and s32 and there is no edge between s43 and s33, it follows that the edge must be between s32 and s33, that the edge occurred not in the S4 and that the set S4 is correct.

To perform the proposed correction the discontinuity corrector 24 is operable to correct a detected discontinuity of a sample by replacing said sample value by the sample value of the corresponding sample of said previous set of a at least two subsequent samples of the same pixel signal. In particular, referring to set S3 shown in FIG. 5, the intensity value of the sample s33 is replaced by the sample value of sample s23, and the intensity value of the sample s34 is replaced by the sample value of sample s24. This results in the situation shown in FIG. 6.

After this correction the corrected set S3' does no longer include any discontinuity. The corrected set S3' is then used by said information value calculator 20 to determine the information value for this set, in particular in this example to determine the depth value 3. As a result an estimated depth curve $D_e$ is obtained which is also shown in FIG. 6 compared to the real depth curve $D_r$. Both depth curves are identical except for the area in which the depth value is generated from the sample values of the samples of the corrected third set S3'. However, this temporal mistake of the scene state at this moment in time can be accepted and is negligible in most applications in view of the obtained advantage.

The proposed method preserves the geometry of a moving object for two reasons: Firstly, the correction affects only a small fraction of the object (its edges). Secondly, opposite edges of the object are affected in an opposite manner, so the average spatial effect of the applied correction is zero. For example, to give a descriptive explanation, a square element moving horizontally in the scene generates motion artifacts on its left and right edge. The proposed invention overwrites the raw values of affected pixels with corresponding values of the prior acquisition. This results in a shift of these edges in the opposite direction of the current movement (towards the origin position of the object). Since both edges are moved by the same distance, the area of the object does not change. Solely its position is adjusted and corresponds to the object's location during the acquisition of the first raw channel.

The following pseudo-code describes an embodiment of the proposed algorithm (referring to depth values as one example for information values):

Let $I_{t,i}$ be the raw value to be measured, with t being the time step of the acquisition and i being the index of n raw channels.

For each pixel do
    For each raw value i of n do $$dI_{t,i} = I_{t0,i} - I_{(t0-1),i};$$

if $|dI_{t0,i}|$>threshold, mark raw value as discontinuous for the current frame t0;
if a subset of raw values was acquired simultaneously:
   mark all raw values of each subframe as discontinuous, if any raw value of the subframe was marked as discontinuous;
if the raw values used for computing the depth value are partly tagged as discontinuous (i.e. not all channels are discontinuous and not all channels are continuous):
   generate a warning signal
   if the raw values used for computing the depth value consists (in temporal order) of one or more continuous values, followed only by one or more discontinuous values, and the correction of raw data is enabled:
      overwrite discontinuous raw values with corresponding values of prior acquisition: $I_{t0,i} \leftarrow I_{(t0-1),1}$, for all channels i marked as discontinuous;
   mark depth value of current pixel and current timestep t0 as corrected; compute depth value.

With the embodiment described above with reference to FIGS. 3 to 6, in the following situations corrections are made (assuming that a set comprises four samples): "-ddd", "--dd", "---d", i.e. where the set consists of one or more continuous values, followed only by one or more discontinuous values. After such a correction, the depth value of the current pixel and at the current time step is preferably marked as corrected.

The above described embodiment of the ToF camera, in particular of the processor 18 shown in FIG. 2, comprises a discontinuity detector and a discontinuity corrector. In another embodiment of the proposed ToF camera the processor 18' illustrated in FIG. 7 comprises no discontinuity corrector, but only an information value calculator 20 and a discontinuity detector 22, since a detection of discontinuities without correction is beneficial in some applications. There are also situations in which a correction fails so that it is preferred to take the detector signal to recognize said discontinuity, but to waive an automatic correction.

Optionally, a warning signal output 26 can be provided that outputs a warning signal in case of a detected discontinuity, if said discontinuity does not appear in the first sample of a set of at least two subsequent samples. Its output could thus be a kind of warning or information signal carrying the information that a discontinuity (or edge) has been detected in the detection signal or in a certain set of samples. Except for the missing discontinuity corrector (which could optionally also be provided here in addition to the optional warning signal output 26 for performing a correction of discontinuities in certain or all situations in which a warning signal is issued by the warning signal output 26) the elements of such a ToF camera and the processor shown in FIG. 7 are generally identical to the elements of the ToF camera shown in FIG. 1 and of the processor shown in FIG. 2.

The embodiment of the ToF camera explained with reference to FIGS. 3 to 6 detects and corrects motion artifacts caused by laterally (or extremely fast) moving objects by analyzing the temporal signal of sensor raw data. Especially moving edges (color, depth, etc.) (in the scene) cause strong errors. A pixel information value (e.g. depth) is erroneous, if (and only if) the edge occurs during the acquisition of the samples within one set of raw data values.

Hence, several cases can be distinguished:
a) occurrence of the edge: the edge may occur between the acquisition of two subsequent samples, or during the acquisition of one sample (e.g. set S1 consists of samples s11, s12, s13, s14; the two possibilities are: s11-s12-(edge)-s13-s14 or s11-s12-[s1 (edge)3]-s14);
b) the number of edges: one edge hits the pixel during acquisition of two compared sets of samples or more than one edge hits the pixel during acquisition of two compared sets.

With respect to case a) it can be noted that current systems typically have very short integration times (for single samples) compared to the delay between the samples. Therefore the possibility of an edge occurring during the acquisition of two samples is much more likely. However, if it occurs during the acquisition of one sample, it will (depending on its exact temporal occurrence and the setting of the threshold of the discontinuity detector) lead to a detected discontinuity of the current sample, or of the subsequent sample. Both cases will be handled correctly by the proposed camera.

With respect to case b) it can be noted that with the algorithm of the above described embodiment generally only one edge occurring in the two sets from which samples are used for comparison, is dealt with correctly. For example, if samples from consecutive sets are compared, only one edge occurring in two consecutive sets is allowed. For instance, if there is one edge ("E") and four samples per set, the following cases can occur ("0" meaning no discontinuity, "d" meaning discontinuity):

| previous set | | | | current set (to be corrected) | | | | comment |
|---|---|---|---|---|---|---|---|---|
| E d | D | d | d | 0 | 0 | 0 | 0 | no edge in set |
| 0 E | D | d | d | d | 0 | 0 | 0 | no edge in set |
| 0 | 0 E | d | d | d | d | 0 | 0 | no edge in set |
| 0 | 0 | 0 E | d | d | d | d | 0 | no edge in set |
| 0 | 0 | 0 | 0 E | d | d | d | D | no edge in set |
| 0 | 0 | 0 | 0 | 0 E | d | d | D | correction |
| 0 | 0 | 0 | 0 | 0 | 0 E | d | D | correction |
| 0 | 0 | 0 | 0 | 0 | 0 | 0 E | D | correction |
| 0 | 0 | 0 | 0 | 0 | 0 | 0 | 0 | no edge in set |

For this example a correction of the current set is necessary in the following cases: 0ddd, 00dd, 000d. Analogously, for a set consisting of two samples this case to be corrected is 0d. For three samples the cases to be corrected are 0dd and 00d. The general rule for correction is (under the assumption that there is only a single edge per set and that after a detected discontinuity in a set all subsequent samples of the same set also show a discontinuity) is that a discontinuity shall be corrected if the discontinuity is not in the first sample of a set and if there is a discontinuity in at least one of the following samples of the same set. If one of these following samples is discontinuous and the assumption is valid that there is one edge per set at most, also all following samples of the set will be discontinuous, i.e. cases like 0d0 violate this assumption and should not occur.

In another embodiment the discontinuity corrector 24 is operable to correct a detected discontinuity of a sample in the set S3 of at least two subsequent samples, if said discontinuity does not appear in the first sample s31 of said set S3 and if after a first detected discontinuity (within all subsequent samples s32, s33, s34) also all samples of said set S3 after said first detected discontinuity are detected as discontinuous. This covers situations like 0ddd and 00dd, but excludes situations like 0dd0 and is generally more robust than the above explained embodiment of the discontinuity detection, which in turn is generally faster in computation time.

Now, it is assumed that there can be more than one edge in two compared sets. For instance, as an example, two samples per set, the comparison of data from consecutive sets for determining discontinuities, and the following scenario shall be considered:

| Set | previous set | | current set (to be corrected) | |
|---|---|---|---|---|
| depth | 1 | 2 | 1 | 1 |
| edge | | E | E | |
| discontinuity | 0 | d | 0 | d |

The following problem appears: Following the above formulated rule, the sequence 0d would lead to a correction, which would provide a wrong result (instead no correction would have been necessary in this case). However, the occurrence of discontinuities could be used as an indicator for unreliable depth information (or, more generally, of an unreliable information value) of that pixel.

Hence, the following situations can be distinguished in an advanced mode considering that there could be more than one edges per set of samples:
A) normal case: the set consists of zero or more discontinuous samples, followed only by zero or more continuous samples (e.g., in case of four samples per set: 0000, d000, dd00, ddd0, dddd);
B) warning: all possible cases which are not in A), e.g. 0d00, 00dd, 00d0, 0dd0, 0ddd, d0d0, dd0d;
C) (a subset of B) correction (optional): (not the first sample is discontinuous) AND (all following samples after the first detected discontinuity are discontinuous), e.g. 0ddd, 00dd, 000d.

Hence, in an embodiment the following rule is implemented to deal with the above explained situations: if the currently detected case for a set corresponds to a situation of case A, nothing shall be done, i.e. no warning of a discontinuity or a correction shall be made. Otherwise, a warning shall be issued (e.g. a waning flag indicating one or more detected discontinuities shall be set), e.g. by the optional warning signal output 26 shown in FIG. 7, and, if the currently detected case for a set corresponds to a situation of case C, a correction (if desired) shall be performed by the discontinuity corrector 24 shown in FIG. 2.

Generally, the discontinuity corrector 24 and the warning signal output 26 could be operable such that in the same detected situations both a correction is made and a warning signal is issued. In another embodiment, only in certain situations (as explained above) a correction is made, while generally in case of a detected discontinuity (i.e. also if it is not corrected) a warning signal is issued, i.e. in more situations a warning signal is issued. In still another embodiment, a warning signal is only issued if a discontinuity is detected (provided it is not in the first sample), but it is not corrected, i.e. in such situations either a warning signal is issued or a correction is made, but not both. Still further, in an embodiment, no correction is made at all and only a warning signal is issued, for which embodiment the warning signal output 26 could apply one or more of the rules explained above for the discontinuity corrector 24. Preferable, for each information value generated from corrected raw data, a signal describing this property should be set (for instance indicating, that a depth value was not purely measured but generated from partly corrected data).

In a preferred embodiment the discontinuity detector 22 is operable to individually determine for the samples of a set of at least two samples the difference value between a sample value of a sample of said set and the sample value of the corresponding sample in the previous set of at least two samples, to determine if said difference value exceeds a predetermined discontinuity threshold and to mark a sample as discontinuous if the corresponding difference value exceeds said predetermined discontinuity threshold. Said discontinuity threshold is preferably set by the user or designer of the method. The optimal setting generally depends on the used hardware, the scene parameters and the desired accuracy. Just to give an example a threshold of 5% of the sample values may be a reasonable value, but the threshold may also be selected larger or smaller. Also an automatic adaption of said discontinuity threshold is generally possible.

Preferably, said discontinuity detector and said discontinuity corrector are operable to detect and correct, respectively, discontinuities in all pixels of said radiation detector. However, in other embodiments only selected pixels may be used for discontinuity detection and correction. For instance, in areas where no moving edges and/or no motion artifacts are to be expected (or are proven to be free from moving edges and motion artifacts), the proposed method does not need to be applied to save processing efforts and time. Such areas could be marked accordingly, and also respective algorithms could be applied to find such areas. Alternatively, prior knowledge about the scene could be used to identify such areas. An area in that sense does not include only a connected set of pixels, but stand for an arbitrary subset of available pixels.

As already mentioned, in an embodiment the radiation source is operable to continuously emit electromagnetic radiation and the information value calculator is operable to determine the information values based on phase information of said samples from said set of at least two subsequent samples of the same pixel signal. Alternatively, the radiation source is operable to emit radiation pulses and the information value calculator is operable to determine the information values based on intensity information of said samples from said set of at least two subsequent samples of the same pixel signal. Hence, different principles of how to irradiate a scene and how to evaluate the reflected radiation can be applied in combination with the present invention.

According to the invention a set of samples, from which an information value is determined, comprises at least two samples. Preferably, however, at least three samples are used, and accordingly, the information value calculator, the discontinuity detector and the discontinuity corrector are operable to process sets of at least three subsequent samples of the same pixel signal. In particular if there is some knowledge about the scene, also a detection using two samples in each set is feasible, for instance if the intensity of the non-modulated light is known (i.e. that there are two unknowns, in particular phase shift and amplitude in case of the acquisition of depth images). This is, for instance, the case in Fluorescense Lifetime Imaging (FLIM), a ToF application other than depth imaging, where the phase shift of a specimen is measured using a microscope, to estimate environmental parameters (temperature, oxygen concentration, . . . ), etc. In this application, ambient light is typically not present, and the characteristics of the light source (in particular the intensity of its non-modulated radiation) are well known. In principle, the present invention may be applied also for FLIM applications.

Using more than three samples may also have advantages for some applications. For instance in FLIM applications, it enables the separation of multiple mixed phases. In depth imaging it enables the correction of higher harmonics of the radiation source. In general, however, there is no upper limit for the number of samples in a set.

The invention preferably uses a detector having a plurality of pixels, preferably arranged as an array. However, in some applications a detector having only a single pixel may be used. In this case the 3D ToF camera is actually to be understood as a camera delivering only (one-dimensional) depth information but no information in the other two directions.

Any kind of electromagnetic radiation may be used in the device and method according to the present invention. This includes more than just the visible spectrum, e.g. x-Ray, ultraviolet, infrared, terahertz, microwave and radio. For most kinds of radiation (particularly except ultraviolet, infrared and visible light) a modified detector should be used (particularly other than pure silicon, including for instance converters (X-ray to visible light) or micro-antennas (e.g. for terahertz radiation)).

Preferably, the evaluation unit is operable to generate scene-related information about the distance of one or more objects of the scene, the reflectivity of one or more objects of the scene and/or the intensity of ambient radiation, in particular of ambient light. However, other scene-related information may also be generated by use of the present invention.

For instance, a very primitive ToF sensor (i.e. detector) could recognize objects entering a certain depth range, without explicitly computing their depth (e.g. by comparing sensor raw data with predefined thresholds). Such a system could also use the invention.

Further, the invention may be used in FLIM applications. Such a FLIM setup is typically based on a fluorescence microscope, using a source of radiation (e.g. LASER or LED) to illuminate a specimen with electromagnetic radiation of a certain wavelength. The specimen contains substances (e.g. dyes) which are able to fluorescence, meaning these substances are able to absorb light of a certain wavelength (preferable corresponding to the light sources wavelength), and, after a certain time delay, emit light of another wavelength. Since this decay is a quantum process, said time delay is defined by a decay time, which is the most probable delay time for a multitude of fluorescent particles. Decay times may lie in the range of hours to attoseconds ($10^{-18}$ s). Typical decay times used for FLIM are in the range of 1 ms to 1 ns. In a FLIM setup the light source is controllable, and the detector is able to perform a measurement which enables the computation of this decay time. For instance, a continuous-wave ToF detector could be used to measure the phase shift between the incident fluorescent light and the light source signal, enabling the computation of decay times. If a detector is used which comprises a multitude of pixels, such measurement of the decay time could be spatially resolved. Special dyes exist, of which the decay time depends on environmental parameters. For instance, there are dyes with the decay time depending on the local oxygen concentration, the temperature, the pressure, etc. By using such dyes in or near the specimen, the measurement of these environmental parameters gets feasible. It should be noted, however, that there might exist setups of FLIM which do not employ ToF technique.

Another field of application of the invention is Pressure Sensitive Paint (PSP). Pressure sensitive paint is used for instance in aerodynamic experiments, for measuring the air pressure on the surface of a model remotely. The principle is very similar to FLIM: A specimen is painted with a substance which contains a dye, which has a decay time depending on the local air pressure. By measuring the decay time it is possible to estimate the local pressure, which is important information for aerodynamic experiments. Typical decay times used for PSP are in the range of 1 ms to 1 ns. It should be noted, however, that there might exist setups of PSP which do not employ ToF technique.

The proposed solution may be applied for data acquired by all kind of time-of-flight cameras, including pulse-based and continuous-wave systems. The invention enables the detection and neutralization of motion artifacts, caused by lateral movement or fast changes of scene features. Thus, the quality of generated scene-related information, e.g. depth maps, is enhanced. For this purpose the proposed invention preferably performs a local analysis, using only raw values and temporal relations of the pixels being corrected, which results in a low complexity of the algorithm (O(n), with n being the number of pixels) and thus enables real-time implementations. The proposed method is particularly several magnitudes faster than the motion compensation algorithm based on optical flow estimation, as proposed in the above cited article of Lindner/Kolb.

In summary, known 3D ToF cameras measure distance maps by combining multiple raw images. Current systems are not able to acquire all raw images instantaneously, but have to capture them consecutively. If the observed scene is changing during this process, the computed depth map is incorrect. Especially moving depth- or color-edges lead to strong errors, so called motion artifacts. The proposed solution detects and, preferably, compensates such artifacts. This real-time method identifies affected pixels, and uses raw values of the prior acquisition for computing desired scene-related information values.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A 3D time-of-flight imaging device for acquiring information about a scene, comprising:
    a radiation source that generates and emits electromagnetic radiation for illuminating said scene;
    a radiation detector that detects electromagnetic radiation reflected from said scene, said radiation detector comprising one or more pixels, wherein said one or more pixels individually detect electromagnetic radiation reflected from said scene and generate a pixel signal;
    an evaluation unit that generates scene-related information from said one or more pixel signals;
    an information value calculator that determines an information value of said scene-related information from a set of at least two subsequent samples of the same pixel signal; and
    a discontinuity detector that detects if in said set of at least two subsequent samples a discontinuity appears compared to the previous set of at least two subsequent samples of the same pixel signal, wherein said evaluation unit is further configured to determine whether to correct said detected discontinuity based on whether data resulting from said detected discontinuity after correction is better than data resulting from said detected discontinuity without correction.

2. The 3D time-of-flight imaging device as claimed in claim 1, further comprising a discontinuity corrector that corrects a detected discontinuity of a sample in said set of at least two subsequent samples by replacing the sample value of said sample by the sample value of the corresponding sample of said previous set of at least two subsequent samples of the same pixel signal, wherein said information value calculator is configured to use said corrected set of at least two subsequent samples of the same pixel signal to determine said information value.

3. The 3D time-of-flight imaging device as claimed in claim 2, wherein said discontinuity corrector is configured to correct a detected discontinuity of a sample in said set of at least two subsequent samples, if said discontinuity does not appear in the first sample of said set and if among all subsequent samples of said set at least in the last sample a discontinuity is detected.

4. The 3D time-of-flight imaging device as claimed in claim 2, wherein said discontinuity corrector is configured to correct a detected discontinuity of a sample in said set of at least two subsequent samples, if said discontinuity does not appear in the first sample of said set and if among all subsequent samples of said set at least one discontinuity is detected.

5. The 3D time-of-flight imaging device as claimed in claim 2, wherein said discontinuity corrector is configured to correct a detected discontinuity of a sample in said set of at least two subsequent samples, if said discontinuity does not appear in the first sample of said set and if after a first detected discontinuity all subsequent samples of said set after said first detected discontinuity are detected as discontinuous.

6. The 3D time-of-flight imaging device as claimed in claim 1, wherein said radiation detector generates a warning signal in case of a detected discontinuity, if said discontinuity does not appear in the first sample of a set of at least two subsequent samples and if not for all samples of said set of at least two samples a discontinuity is detected.

7. The 3D time-of-flight imaging device as claimed in claim 1, wherein said discontinuity detector is configured to separately compare the sample values of the samples of said set of least two subsequent samples to the sample values of the samples of the previous set of at least two subsequent uncorrected samples of the same pixel signal for detecting discontinuities in said set.

8. The 3D time-of-flight imaging device as claimed in claim 1, wherein said discontinuity detector is configured to individually determine for said samples of said set of at least two samples the difference value between a sample value of a sample of said set and the sample value of the corresponding sample in the previous set of at least two samples, to determine if said difference value exceeds a predetermined discontinuity threshold and to mark a sample as discontinuous if the corresponding difference value exceeds said predetermined discontinuity threshold.

9. The 3D time-of-flight imaging device as claimed in claim 1, wherein said discontinuity detector is configured to detect discontinuities in all pixels of said radiation detector.

10. The 3D time-of-flight imaging device as claimed in claim 1, wherein said discontinuity corrector is configured to correct discontinuities in all pixels of said radiation detector.

11. The 3D time-of-flight imaging device as claimed in claim 1, wherein said discontinuity detector is configured to detect discontinuities in selected pixels of said radiation detector only, in pixels detecting radiation from areas of said scene actually or expectedly showing rapid changes of scene features or lateral movements of scene objects.

12. The 3D time-of-flight imaging device as claimed in claim 1, wherein said discontinuity corrector are configured to correct discontinuities in selected pixels of said radiation detector only, in pixels detecting radiation from areas of said scene actually or expectedly showing lateral movements of scene objects or fast changes of scene features.

13. The 3D time-of-flight imaging device as claimed in claim 1, wherein said radiation source is configured to emit electromagnetic radiation in the wavelength range from 1 nm to 1 cm, to emit infrared, visible or ultraviolet light.

14. The 3D time-of-flight imaging device as claimed in claim 1, wherein said radiation source is configured to continuously emit electromagnetic radiation and wherein said information value calculator is configured to determine said information values based on phase information of light reflected from the scene, resulting in a modification of said samples from said set of at least two subsequent samples of the same pixel signal.

15. The 3D time-of-flight imaging device as claimed in claim 1, wherein said radiation source is configured to emit radiation pulses and wherein said information value calculator is configured to determine said information values based on intensity information of said samples from said set of at least two subsequent samples of the same pixel signal.

16. The 3D time-of-flight imaging device as claimed in claim 1, wherein said evaluation unit is configured to generate scene-related information about the distance of one or more objects of the scene, the reflectivity of one or more objects of the scene and/or the intensity of non-modulated radiation, comprising of ambient light and non-modulated light of the radiation source, reflected by the scene.

17. The 3D time-of-flight imaging device as claimed in claim 1, wherein said information value calculator, said discontinuity detector and/or said discontinuity corrector are configured to process sets of at least three subsequent samples of the same pixel signal.

18. A 3D time-of-flight method for acquiring information about a scene, comprising the steps of:

generating and emitting electromagnetic radiation for illuminating said scene;

detecting electromagnetic radiation reflected from said scene by a radiation detector comprising one or more pixels, an array of pixels, wherein said one or more pixels individually detect electromagnetic radiation reflected from said scene and generate a pixel signal;

generating scene-related information from said one or more pixel signals;

determining an information value of said scene-related information from a set of at least two subsequent samples of the same pixel signal; and detecting if in said set of at least two subsequent samples a discontinuity appears compared to the previous set of at least two subsequent samples of the same pixel signal; and determining whether to correct said detected discontinuity based on whether data resulting from said detected discontinuity after correction is better than data resulting from said detected discontinuity without correction.

19. A processor for use in a 3D time-of-flight imaging device for acquiring information about a scene, comprising:

a radiation source that generates and emits electromagnetic radiation for illuminating said scene;

a radiation detector that detects electromagnetic radiation reflected from said scene, said radiation detector comprising one or more pixels, wherein said one or more pixels individually detect electromagnetic radiation reflected from said scene and generate a pixel signal, said processor being configured to generate scene-related information from said one or more pixel signals;

an information value calculator that determines an information value of said scene-related information from a set of at least two subsequent samples of the same pixel signal; and a discontinuity detector that detects if in said set of at least two subsequent samples a discontinuity appears compared to the previous set of at least two subsequent samples of the same pixel signal, wherein said processor is further configured to determine whether to correct said detected discontinuity based on whether data resulting from said detected discontinuity after correction is better than data resulting from said detected discontinuity without correction.

20. A processing method for use in a 3D time-of-flight method for acquiring information about a scene comprising the steps of:

generating and emitting electromagnetic radiation for illuminating said scene;

detecting electromagnetic radiation reflected from said scene by a radiation detector comprising one or more pixels, wherein said one or more pixels individually detect electromagnetic radiation reflected from said scene and generate a pixel signal;

generating distance values from said pixel signals;

determining an information value of said scene-related information from a set of at least two subsequent samples of the same pixel signal;

detecting if in said set of at least two subsequent samples a discontinuity appears compared to the previous set of at least two subsequent samples of the same pixel signal; and determining whether to correct said detected discontinuity based on whether data resulting from said detected discontinuity after correction is better than data resulting from said detected discontinuity without correction.

21. Computer readable non-transitory medium having instructions stored thereon which, when carried out on a computer, cause the computer to perform the steps of the method as claimed in claim 20.

\* \* \* \* \*